Figure 3:
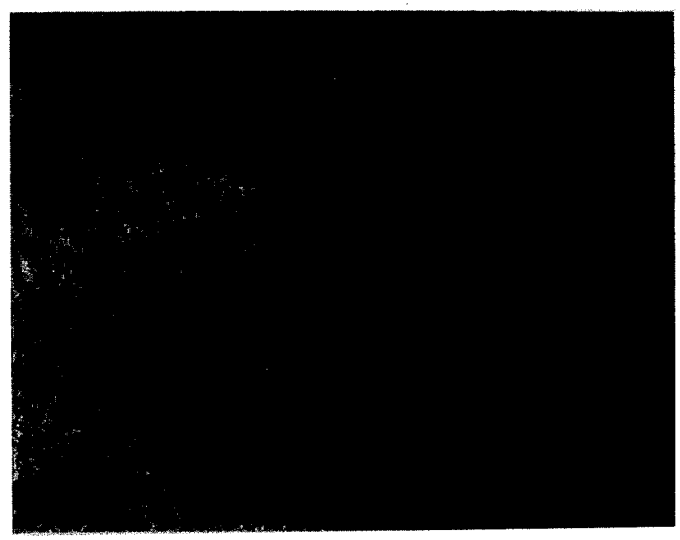

United States Patent [19]

Rao et al.

[11] 4,007,056

[45] Feb. 8, 1977

[54] LEAD BASE CADMIUM-TIN ALLOY USEFUL FOR FORMING BATTERY COMPONENTS

[75] Inventors: Purushothama Rao, Burnsville; George W. Mao, St. Paul, both of Minn.

[73] Assignee: Gould Inc., Rolling Meadows, Ill.

[22] Filed: May 23, 1975

[21] Appl. No.: 580,194

Related U.S. Application Data

[63] Continuation of Ser. No. 403,178, Oct. 3, 1973, abandoned.

[52] U.S. Cl. .............................. 429/222; 429/226
[51] Int. Cl.² ......................................... H01M 39/00
[58] Field of Search ............ 136/65, 26, 27, 134 R; 75/166 D, 151, 175 R

[56] References Cited

UNITED STATES PATENTS

| | | | |
|---|---|---|---|
| 3,287,165 | 11/1966 | Jensen | 136/65 |
| 3,355,284 | 11/1967 | Harvey | 75/166 D |
| 3,755,094 | 8/1973 | Seyb | 204/51 |
| 3,912,544 | 10/1975 | Sabatino | 136/134 R |

FOREIGN PATENTS OR APPLICATIONS 1,452,761  9/1966  France .............................. 75/166 D

*Primary Examiner*—Anthony Skapars
*Attorney, Agent, or Firm*—Leydig, Voit, Osann, Mayer & Holt, Ltd.

[57] ABSTRACT

A cadmium-tin-lead alloy composition containing at least 0.4 percent by weight of both cadmium and tin is used for forming the straps employed which weld together the lugs of the grids in lead-acid storage batteries. The relatively small amount of cadmium and tin provide a large volume fraction of a cadmium-tin eutectic phase that is low melting and serves to facilitate the welding. This alloy composition may also be used to form intercell connectors and terminal posts for such batteries.

7 Claims, 3 Drawing Figures

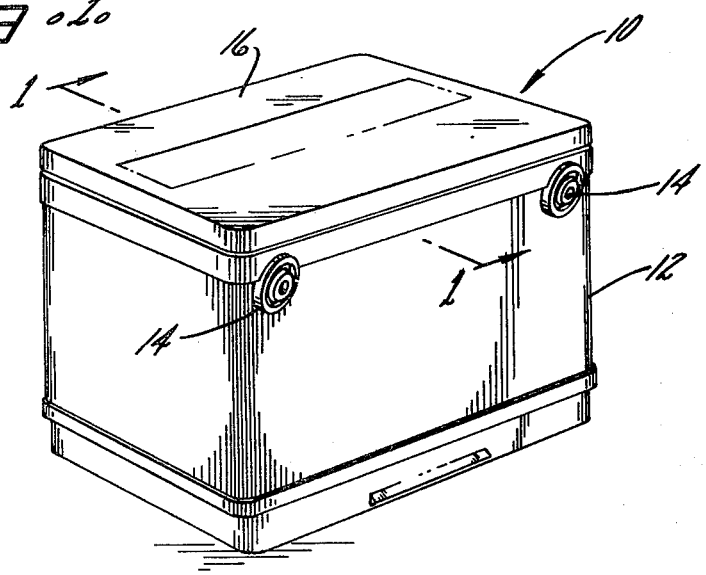
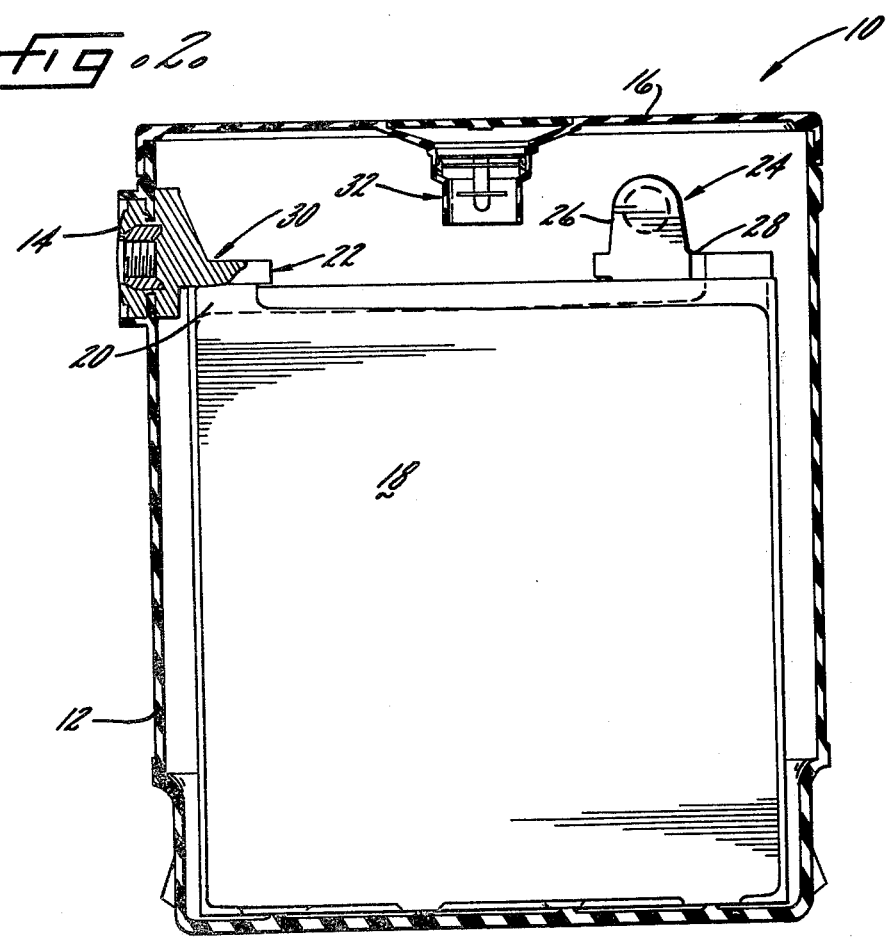

LEAD BASE CADMIUM-TIN ALLOY USEFUL FOR FORMING BATTERY COMPONENTS

RELATED APPLICATIONS

This is a continuation of application Ser No. 403,178, filed Oct. 3, 1973, now abandoned.

Miller, Ser. No. 222,611, filed Feb. 1, 1972, for: "Cover Design for Maintenance-Free Battery."

Mao and Rao, filed on even date herewith, for: "Lead Base Calcium-Tin Alloy and Use Thereof for Lead-Acid Battery Grid Fabrication."

DESCRIPTION OF THE INVENTION

This invention relates generally to alloy compositions and, more particularly, to an alloy composition useful in forming components of battery elements and for welding such components.

There has been much recent interest in providing automotive type, wet cell, lead-acid storage batteries in configurations which can be readily installed and which require, once in service, no further maintenance throughout the expected life of the battery. One aspect of this effort to provide such maintenance-free batteries is to utilize internal components which make it unnecessary to inspect and replenish electrolyte levels in the cells over the normal battery life. In accordance with this aspect, it is desirable to maintain the fully charged state of the battery. The use of conventional lead-antimony grids is undesirable in this application because these grids require a relatively large amount of current at a given constant voltage charge to maintain the fully charged state, and this excessive amount of current results in a concomitant excessive consumption of water in the electrolyte. This also causes increased corrosion in the grids.

Our copending application, referred to herein, discloses a low tin content lead-calcium alloy composition which requires substantially less current to maintain the fully charged state and may thus be advantageously used in a maintenance-free battery. However, as is conventional, the lugs on the individual grids must be welded together by, for example, straps formed from the base portion of the intercell connectors and a welding or burning rod. Similarly, the two battery post terminals must also be welded to the grid lugs. It has been found that, in welding the grids formed from calcium-lead alloys and calcium-tin-lead alloys, a significant amount of calcium is oxidized; and this impedes the smooth welding of the grids to the strap.

It is accordingly an object of the present invention to provide an alloy composition which is useful in making certain components of the conventional battery elements such as the burning rods forming a portion of the straps, the intercell connectors and the terminal posts. A related and more specific object is to provide an alloy composition which may be readily cast into such components.

Another object provides an alloy composition that minimizes the time needed for welding calcium-lead alloy grids together. A related and more specific object is to provide an alloy composition providing a relatively large volume fraction of a low melting point eutectic phase at low solute concentrations which allows the use of a lower temperature during welding as well as a shorter welding time so as to minimize any possible damage during welding to the battery container or other components.

A still further object lies in the provision of alloy compositions which may be utilized to minimize the amount of dross formed during the welding of the battery elements, thus achieving unimpeded metal flow and forming a defect-free component.

Yet another object is to provide an alloy composition characterized by adequate strength and toughness properties that can withstand the conditions to which the batteries are exposed in actual usage.

A further object provides a relatively economical alloy composition characterized by its capability to be used in a maintenance-free battery without adversely affecting the electrical and electrochemical characteristics of such batteries.

Other objects and advanatages of the present invention will be apparent as the following description proceeds, taken in conjunction with the accompanying drawings in which:

FIG. 1 is a perspective view of a maintenance-free battery;

FIG. 2 is a cross-sectional view, taken generally along the lines 1—1 of FIG. 1 and illustrating a battery element in which the lugs of the respective positive and negative grids are welded together by the novel alloy compositions of the present invention and FIG. 3 is a photomicrograph, 100 magnification, of the surface of a battery strap formed from the novel alloy composition of the present invention and showing the eutectic phase homogeneously dispersed through the lead matrix.

While the invention is susceptible of various modifications and alternative forms, specific embodiments thereof have been shown by way of example in the drawings and will hereafter be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims. For example, while the battery grids which will be described herein as being formed from calcium-lead alloys, it should be appreciated that the novel alloys of the present invention may also be suitably used to form battery grids useful in the batteries described herein. Further, while the present invention finds particular advantageous use when employed in connection with a maintenance-free battery, it should be understood that the present invention may be similarly employed with any other type of lead-acid battery. Still further, while the embodiment described and illustrated uses a burning rod to supply the additional material to form the strap, it should be understood that this invention may also be used in connection with any other method for joining the battery grids together.

Turning now the drawings, FIGS. 1 and 2 show a maintenance-free battery 10 including a container 12, a pair of terminal posts 14 and a cover 16 sealed to the container by any conventional means.

The container is divided into a plurality of cells (a portion of one cell being shown in FIG. 2), and a battery element is disposed in each of such cells. The battery element comprises a plurality of electrodes, one being shown generally at 18. These include a supporting grid structure having an integral lug 20, a layer of active material attached thereto and a strap 22 joining the lugs 20 of the respective positive and negative grid structures together. The supporting grid structures are preferably formed, when the present invention is used in connection with a maintenance-free battery, of the low tin content calcium-lead alloy composition described in our copending application, which has been identified herein.

Intercell connectors are shown generally at 24 and include a lug 26 and a base 28, the base 28 forming a part of the strap 22 after assembly of the components into a battery element, as by welding. The terminal posts 14 are similarly electrically connected through separate straps 22 to the supporting grid structure during assembly, the base 30 of the terminal posts forming a part of the straps 22. Suitable venting means for allowing evolved gases to escape are shown at 32.

In accordance with the present invention, at least the straps are formed from an alloy composition which minimizes the amount of time required in welding the lugs of the grid supporting structures together while providing adequate strength and toughness characteristics so that the battery can withstand the conditions encountered in actual usage. More specifically, pursuant to this invention, the lugs of the grid supporting structures are welded together by utilizing a ternary alloy composition of cadmium, tin and lead which forms a low melting point cadmium-tin eutectic phase, having a melting point of 350° F. and being homogeneously distributed in the lead matrix. The alloy may be formed by any conventional means and should contain at least 0.4 percent of both cadmium and tin, based upon the total weight of the composition. As the amount of cadmium and tin decrease below this level, the ductility and strength characteristics become inadequate for the uses described herein. Further, potential difficulties in achieving easy welding are presented.

For most applications, it has been found that the level of both cadmium and tin are each preferably within the range, based upon the total weight of the composition, of from about 0.4 to about 1.4 percent. This provides the requisite strength and toughness properties while also achieving a large volume fraction of the cadmium-tin eutectic phase in the lead matrix despite the relatively minor weight percentage of the cadmium and tin components. As can be seen in FIG. 3, showing the surface structure of a ternary alloy consisting of, by weight, 0.7 percent cadmium, 0.7 percent tin and the remainder lead, the cadmium-tin eutectic phase presents a large volume fraction distributed through the lead matrix. This large volume fraction allows a minimum amount of welding time and a lower welding temperature because the low melting point cadmium-tin eutectic phase serves, in effect, to initiate the melting of the alloy and allows free-unimpeded alloy flow as well as a lower welding temperature. This minimizes any possible damage to the battery container or other components and is particularly advantageous when the container is formed from a plastic material. While cadmium and tin levels in excess of the range set forth herein may suitably be used, no substantial benefits are achieved; and the increased amounts constitute an economic penalty.

The cadmium-tin eutectic phase that is formed constitutes approximately 67 percent by weight tin; and, in accordance with a further aspect of the present invention, it is preferred to select the proportions of the cadmium and tin so that the cadmium is present in excess of the amount required to form the eutectic phase. More particularly, it is preferred to include cadmium in sufficient excess so that free cadmium will precipitate. This appears to enhance the strength and toughness properties of the straps as well as to facilitate the welding when the grids are formed of a calcium-containing, lead alloy. It is theorized that the presence of the excess cadmium causes the calcium in the alloy used to form the grid structure to preferentially tend to dissolve in the cadmium as opposed to oxidizing which creates undesirable dross. Sufficient excess cadmium may be provided by incorporating equal proportions of the cadmium and tin.

According to a further aspect of the present invention, the other components that are welded to form the battery elements are also made from the novel cadmium-tin-lead alloy compositions which have been described herein. Thus, it is preferred to form the terminal posts and the intercell connectors from such alloys as well.

It should be appreciated that the alloy compositions of the present invention may likely include, as impurities, negligible amounts of the materials that are typically found in the commercially available, battery grade lead. While impurities may be contained in the cadmium and tin components, the relatively small amounts of these components make the impurities typically unimportant. Similarly, if desired, it should be appreciated that the compositions of the present invention may include other alloying ingredients so long as the properties of the resulting alloy composition do not significantly depart in any adverse way from the properties of the alloy composition of the present invention which have been described herein.

The following example is intended to be merely illustrative of the present invention and not in limitation thereof.

EXAMPLE

Lead base alloy compositions of varying tin and cadmium content were cast as tensile test specimens having a reduced size, central portion with a cross section of 0.5 × 0.125 inch and a 2 inch gage length.

The ultimate tensile strength (UTS), yield strength (YS) and percentage elongation were tested for each specimen on an Instron Tensile Tester; and the results are set forth in Table 1:

TABLE 1

| 0.4 Cd-0.4Sn | | | 0.6 Cd-0.6Sn | | | 0.8Cd-0.8Sn | | |
| --- | --- | --- | --- | --- | --- | --- | --- | --- |
| UTS psi | YS psi | Elongation % | UTS psi | YS psi | Elongation % | UTS psi | YS psi | Elongation % |
| 3500 | 1170 | 35 | 4290 | 1280 | 24 | 4670 | 1520 | 23 |

The tensile test specimens of the alloys exhibit satisfactory levels of strength and elongation, and the alloy properties are adequate so that it may be used for battery straps in lead-acid batteries which have been described herein as well as forming suitable compositions for use as the intercell connectors and the terminal posts.

Thus, as has been seen, the present invention provides a novel lead alloy composition providing a relatively large volume fraction of a low melting point cadmium-tin eutectic phase, despite the presence of extremely small amounts of these components. This alloy composition possess good casting properties and may be readily formed into battery straps, intercell connectors and terminal posts. This alloy finds particular advantageous utility in connection with the welding of grids formed of calcium-tin-lead alloys which are useful in maintenance-free, lead-acid batteries. When formed into the various battery components described herein, the resulting components do not adversely affect the electrical and electrochemical characteristics of batteries using such grids from the desirable capacity retention and other attributes of such grids.

We claim as our invention:

1. In a lead-acid battery comprising a battery container having a plurality of cells, a cover sealed to the container, venting means providing passages for the escape of evolved gas and an electrolyte contained in the cells, each cell having components including a plurality of electrodes disposed therein comprising a grid supporting structure having a lug and formed of a calcium containing lead alloy and having a layer of active material attached thereto, a strap joining the lugs of the grids together, a pair of terminal posts electrically connected to the straps in two of the cells of the battery and intercell connectors connected to the straps and electrically connecting adjacent cells, the improvement wherein at least one of said components comprise an alloy composition consisting of a lead matrix having dispersed therein a cadmium-tin eutectic phase, the cadmium and tin being each present in an amount of from about 0.4 to about 1.4 percent by weight, based upon the total weight of said alloy composition.

2. The lead-acid battery of claim 1 wherein the cadmium and tin are present in substantially the same amounts.

3. The lead-acid battery of claim 1 wherein the cadmium is present in an amount sufficient to provide free cadmium dispersed in the lead matrix.

4. The lead-acid battery of claim 1 wherein the cadmium and tin are each present in an amount of from about 0.6 to about 0.8 percent by weight.

5. For use in a lead-acid battery, a terminal post comprising an alloy composition consisting essentially of a lead matrix having dispersed therein a cadmium-tin eutectic phase, the cadmium and tin being each present in an amount of at least 0.4 percent by weight, based upon the total weight of the alloy composition.

6. An intercell connector for a lead-acid storage battery, said intercell connector comprising an alloy composition consisting essentially of a lead matrix having dispersed therein a cadmium-tin eutectic phase, the cadmium and tin each being present in an amount of at least 0.4 percent by weight, based upon the total weight of the composition.

7. A strap for joining a plurality of grids in a lead-acid storage battery, said strap comprising an alloy composition consisting essentially of a lead matrix having dispersed therein a cadmium-tin eutectic phase, the cadmium and tin each being present in an amount of at least 0.4 percent by weight, based upon the total weight of said alloy composition.

* * * * *